(12) United States Patent
Ikeda et al.

(10) Patent No.: US 8,853,288 B2
(45) Date of Patent: Oct. 7, 2014

(54) THERMOPLASTIC RESIN FOAM, METHOD OF PRODUCING THE SAME, AND LIGHT REFLECTING MATERIAL USING THE SAME

(71) Applicant: Furukawa Electric Co., Ltd., Tokyo (JP)

(72) Inventors: Hiroyuki Ikeda, Tokyo (JP); Kojiro Inamori, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/768,480

(22) Filed: Feb. 15, 2013

(65) Prior Publication Data

US 2013/0158143 A1 Jun. 20, 2013

Related U.S. Application Data

(63) Continuation of application No. PCT/JP2010/063855, filed on Aug. 17, 2010.

(51) Int. Cl.
*C08K 5/20* (2006.01)
*C08J 9/12* (2006.01)

(52) U.S. Cl.
USPC ............................................. 521/94; 521/189

(58) Field of Classification Search
USPC ........................................................ 521/149
See application file for complete search history.

(56) References Cited

U.S. PATENT DOCUMENTS

| | | | | |
|---|---|---|---|---|
| 6,113,822 A | * | 9/2000 | Adedeji | 264/48 |
| 2007/0170398 A1 | * | 7/2007 | Schmidt et al. | 252/401 |
| 2008/0300334 A1 | | 12/2008 | Masuda et al. | |
| 2009/0043002 A1 | * | 2/2009 | Masuda et al. | 521/123 |
| 2009/0292034 A1 | | 11/2009 | Tomomatsu et al. | |
| 2010/0130651 A1 | * | 5/2010 | Fukawa et al. | 524/88 |

FOREIGN PATENT DOCUMENTS

| | | |
|---|---|---|
| CN | 1997695 A | 7/2007 |
| CN | 101313017 A | 11/2008 |
| CN | 101641409 A | 2/2010 |
| JP | 2713556 B2 | 2/1998 |
| JP | 3459447 B2 | 10/2003 |
| JP | 2007-169554 A | 7/2007 |
| JP | 2007-317550 A | 12/2007 |
| JP | 2008-127467 A | 6/2008 |
| JP | 2009-235312 A | 10/2009 |
| JP | 2010070621 A * | 4/2010 |
| KR | 10-2008-0007410 A | 1/2008 |
| WO | WO 2006/068009 A1 | 6/2006 |
| WO | WO 2007/043627 A1 | 4/2007 |

OTHER PUBLICATIONS

Stumpf, M. "Influence of organic additives on foam morphology of injection-moulded i-PP" from Blowing Agents and Foaming Processes 2009, International Conference, 11th, Hamburg, Germany May 19-20 2009. Organised by Smithers. ISBN 978-1-84735-392-4.*
International Search Report for PCT/JP2010/063855 dated Sep. 21, 2010.
Chinese Office Action issued Mar. 12, 2013 in corresponding Chinese patent application No. 201080044420.X.
Li Dong et al.; Advances in Research and Development on Synthesis of Organic Nuclecating Agent for Polyolefins; Plastics Auxiliaries, Edition 4; pp. 1-6; Dec. 31, 2006.
Korean Office Action for Appl. No. 10-2012-7010112 dated Nov. 12, 2013 (w/ English translation).
Taiwanese Office Action and Search Report, dated Feb. 14, 2014, for Taiwanese Application No. 099127642, with English translation.

* cited by examiner

*Primary Examiner* — Randy Gulakowski
*Assistant Examiner* — Christine Wales
(74) *Attorney, Agent, or Firm* — Birch, Stewart, Kolasch & Birch, LLP

(57) ABSTRACT

A thermoplastic resin foam, having a bubble with an average bubble diameter of 10 μm or less in the inside thereof, in which wherein the thermoplastic resin foam is prepared by using and foaming a thermoplastic resin composition containing 0.25 to 2.5 part(s) by mass of a melt-type crystallization nucleating agent (B), with respect to 100 parts by mass of an amorphous thermoplastic resin (A).

5 Claims, No Drawings

THERMOPLASTIC RESIN FOAM, METHOD OF PRODUCING THE SAME, AND LIGHT REFLECTING MATERIAL USING THE SAME

This application is a Continuation of PCT/JP2010/063855 filed on Aug. 17, 2010. The entire contents are hereby expressly incorporated by reference into the present application.

TECHNICAL FIELD

The present invention relates to a thermoplastic resin foam having uniform and fine bubbles and a method of producing the same. Further, the present invention relates to a light reflecting material using the thermoplastic resin foam having uniform and fine bubbles.

BACKGROUND ART

Conventionally, a reflecting plate prepared by applying a coating material excellent in light reflection property to a metallic plate and a reflecting plate prepared by laminating resin films and the like excellent in the light reflection property on a metallic plate have been used as a reflecting plate of a light and liquid crystal back light. In recent years, power saving and high efficiency have been more required in fields such as a lighting apparatus and a liquid crystal display. In particular, needs for space saving has been enhanced in fields such as an electrical spectacular sign and a display. However, it is hard for the above described reflecting plates to tackle the space saving.

Accordingly, a resin sheet that is excellent in the light reflection property and has fine bubbles (for example, around 1 μm) has been used as a reflecting plate and the like of the light and the liquid crystal back light (for example, see Patent Literature 1). However, since the resin sheet described in Patent Literature 1 is prepared by foaming polyethylene terephthalate that is a crystalline resin, problems in moldability could have occurred.

On the other hand, a foam using an amorphous resin without using a crystalline resin is excellent in the moldability; however, not only fine bubbles but also coarse bubbles with a size of 1 mm or more are easily generated upon foaming, and thus, such a resin had a problem of difficulty in use as various molded articles such as a light reflecting material.

Then, an amorphous thermoplastic resin sheet having a uniform bubble diameter by foaming at less than a glass transition temperature (Tg) of an amorphous thermoplastic resin is proposed (for example, see Patent Literature 2). However, when such an amorphous thermoplastic resin is foamed at a temperature lower than Tg, an expansion ratio is not improved, and thus, not only desired performance is hardly attained but the cost is also disadvantageous.

CITATION LIST

Patent Literatures

Patent Literature 1: Japanese Patent No. 2713556
Patent Literature 2: Japanese Patent No. 3459447

SUMMARY OF INVENTION

Technical Problem

The present invention is contemplated for solving the above described problems, and providing a thermoplastic resin foam having a fine and uniform bubble diameter and being excellent in the moldability and a light reflecting material having a high light reflectivity, which uses the thermoplastic resin foam. Further, the present invention is contemplated for providing a method of producing a thermoplastic resin foam having a fine and uniform bubble diameter.

Solution to Problem

The present inventors intensively studied in order to solve the above described problems; as a result, they found that an amorphous thermoplastic resin foam having a fine and uniform bubble diameter can be produced by adding a specific amount of a melt-type crystallization nucleating agent to an amorphous thermoplastic resin. The present invention was attained based on this finding.

According to the present invention, there is provided the following means:

<1> A thermoplastic resin foam, comprising a bubble with an average bubble diameter of 10 μm or less in the inside thereof,
wherein the thermoplastic resin foam is prepared by using and foaming a thermoplastic resin composition containing 0.25 to 2.5 part(s) by mass of a melt-type crystallization nucleating agent (B), with respect to 100 parts by mass of an amorphous thermoplastic resin (A);
<2> The thermoplastic resin foam described in the item <1>,
wherein the melt-type crystallization nucleating agent (B) is a compound represented by the following formula (1):

$$R^1—(CONHR^2)_a \qquad \text{Formula (1)}$$

wherein $R^1$ represents a saturated or unsaturated aliphatic polycarboxylic acid residue having 2 to 30 carbon atoms, a saturated or unsaturated alicyclic polycarboxylic acid residue having 4 to 28 carbon atoms, or an aromatic polycarboxylic acid residue having 6 to 28 carbon atoms; $R^2$ represents an alkyl group having 1 to 18 carbon atom(s), an alkenyl group having 2 to 18 carbon atoms, a cycloalkyl group or a cycloalkenyl group having 3 to 12 carbon atoms, a phenyl group, a naphthyl group, or an anthryl group; and a represents an integer from 2 to 6;
<3> The thermoplastic resin foam described in the item <1> or <2>,
wherein the melt-type crystallization nucleating agent (B) is at least one selected from the group consisting of trimesic acid tris(t-butylamide), trimesic acid tricyclohexylamide, trimesic acid tri(2-methylcyclohexylamide), trimesic acid tri(4-methylcyclohexylamide), 1,4-cyclohexane dicarboxylic acid dianilide, 1,4-cyclohexanoic acid dicarboxylic acid dicyclohexylamide, 1,4-cyclohexanoic acid dicarboxylic acid dibenzylamide, 2,6-naphthalene dicarboxylic acid dicyclohexylamide, 1,2,3,4-butane tetracarboxylic acid tetracyclohexylamide and 1,2,3,4-butane tetracarboxylic acid tetraanilide;
<4> The thermoplastic resin foam described in any one of the items <1> to <3>,
wherein the thermoplastic resin foam satisfies V-0, V-1 or V-2 in the UL-94 vertical burning test;
<5> The thermoplastic resin foam described in any one of the items <1> to <4>,
wherein the amorphous thermoplastic resin (A) is polycarbonate;
<6> A light reflecting material as described in any one of the items <1> to <5>, being molded by using the amorphous thermoplastic resin foam; and <7> A method of producing a thermoplastic resin foam, comprising the steps of:
preparing a thermoplastic resin composition by melt-dispersing 0.25 to 2.5 part(s) by mass of a melt-type crystallization nucleating agent, with respect to 100 parts by mass of an amorphous thermoplastic resin;
depositing the melt-type crystallization nucleating agent by solidifying the composition followed by impregnating an inert gas to the composition under pressure; and
foaming the composition impregnated with the inert gas by heating at a temperature of a glass transition temperature of the amorphous thermoplastic resin or more under a released pressure.

Herein, the term "polycarboxylic acid residue" refers to a residue that is obtained by removing all carboxyl groups from each polycarboxylic acid.

Advantageous Effects of Invention

The present invention can provide a thermoplastic resin foam having a fine and uniform bubble diameter and being excellent in the moldability and a producing method thereof, as well as a light refection material having a high light reflectivity, which uses the thermoplastic resin foam.

Other and further features and advantages of the invention will appear more fully from the following description.

MODE FOR CARRYING OUT THE INVENTION

The thermoplastic resin foam of the present invention can be prepared by foaming a thermoplastic resin composition containing an amorphous thermoplastic resin (A) and a melt-type crystallization nucleating agent (B). Firstly, an amorphous thermoplastic resin used in the thermoplastic resin foam of the present invention will be described.

(A) Amorphous Thermoplastic Resin

In the present invention, the term "amorphous thermoplastic resin" means a thermoplastic resin not containing a crystal component. For the amorphous thermoplastic resin in the present invention, examples thereof include poly(phenylene ether), a polymer alloy of poly(phenylene ether) and polystylene, poly(methyl methacylate), polycarbonate, polyetherimide, poly(ether sulfone), polyallylsulfone, polyarylate, polyamideimide, a cyclic olefin copolymer, a norbornene-based resin, and a thermoplastic elastomer. These may be used singly or as a mixture of two or more kinds thereof. Among these examples, polycarbonate is particularly preferable from the viewpoints of easiness of flame retardancy and mechanical property of a foam sheet.

In the present invention, a thermoplastic resin is preferably non-crosslinked from the viewpoint of recycling. The thermoplastic resin in the present invention preferably has a mass fraction of a crosslinked portion in the thermoplastic resin (hereinafter, also referred to as a crosslinking degree in the present specification) of less than 10%. A crosslinking agent or a crosslinking aid may be added so as to set a crosslinking degree of the thermoplastic resin preferably at less than 10%.

(B) Melt-Type Crystallization Nucleating Agent

The term "melt-type crystallization nucleating agent" indicates a nucleating agent which is characterized by molting and dispersing in a resin in melt-kneading when added to a thermoplastic resin and being coagulated and solidified (crystallized) to deposit in a temperature-dropping coagulation step. In the present invention, the melt-type crystallization nucleating agent (B) is molten and dispersed to the amorphous thermoplastic resin (A) in molding with heating. In temperature-dropping solidification or gas impregnation after molding, the melt-type crystallization nucleating agent (B) deposits in the amorphous thermoplastic resin (A). As a result, the melt-type crystallization nucleating agent (B) is crystallized. In the foaming step, the deposited melt-type crystallization nucleating agent (B) is the starting point of generation of a bubble nucleus. As a result, a foam having fine bubbles with a mean bubble diameter of 10 μm or less uniformly in the inside thereof and decreased generation of coarse bubbles with a diameter of 1 mm or more can be obtained. Such a foam is molded and a reflection plate having a high reflectivity can be thus obtained.

For the melt-type crystallization nucleating agent used in the present invention is preferably an amide compound having an amide bond. Examples thereof include amino acid, polypeptide, and lactams, in addition to nylon-based polymers such as nylon 6, nylon 66, nylon 6.66, nylon 6.6T, nylon 610, nylon 612, nylon MDX6, nylon 11, nylon 12, and nylon 46 (all of these are trade names). A particularly preferably used amide compound is an amide compound represented by the following formula (1).

$$R^1-(CONHR^2)_a \qquad \text{Formula (1)}$$

In formula (1), $R^1$ represents a saturated or unsaturated aliphatic polycarboxylic acid residue having 2 to 30 carbon atoms, a saturated or unsaturated alicyclic polycarboxylic acid residue having 4 to 28 carbon atoms, or an aromatic polycarboxylic acid residue having 6 to 28 carbon atoms; $R^2$ represents an alkyl group having 1 to 18 carbon atom(s), an alkenyl group having 2 to 18 carbon atoms, a cycloalkyl group or a cycloalkenyl group having 3 to 12 carbon atoms, a phenyl group, a naphthyl group, or an anthryl group; and a represents an integer from 2 to 6.

Examples of an amide compound in the present invention include trimesic acid tris(t-butylamide), trimesic acid tricyclohexylamide, trimesic acid tri(2-methylcyclohexylamide), trimesic acid tri(4-methylcyclohexylamide), 1,4-cyclohexane dicarboxylic acid dianilide, 1,4-cyclohexanoic acid dicarboxylic acid dicyclohexylamide, 1,4-cyclohexanoic acid dicarboxylic acid di(2-methylcyclohexylamide), 1,4-cyclohexanoic acid dicarboxylic acid dibenzylamide, 2,6-naphthalene dicarboxylic acid dicyclohexylamide, 1,2,3,4-butane tetracarboxylic acid tetracyclohexylamide and 1,2,3,4-butane tetracarboxylic acid tetraanilide, and these substances may be used singly or two or more kinds may be used in mixture. Among these examples, trimesic acid tricyclohexylamide or N,N'-dicyclohexyl-2,6-naphthalene dicarboxylic acid dicyclohexylamide is particularly preferable.

The adding amount of the amide compound in the present invention is 0.25 to 2.5 part(s) by mass, preferably 0.5 to 1.5 part(s) by mass, and more preferably 0.5 to 1.0 part by mass, with respect to 100 parts by mass of the amorphous thermoplastic resin. When this amount is too small, an effect of suppressing coarse bubbles cannot be expected. On the other hand, when the amount is too large, an amide compound is not molten, which thus results in deposing the amide compound on the surface of a product as an foreign substance.

In the present invention, the thermoplastic resin foam preferably satisfies V-0, V-1 or V-2 in the UL-94 vertical burning test. In order to satisfy such a determination criteria, a resin composition before foaming preferably contains a flame retardant. A kind of a flame retardant that can be used in the present invention is not particularly limited, but a flame retardant that is used for polymers such as general rubbers and resins may be used. Examples include bromine-based flame retardants, phosphorus-based flame retardants, nitrogen-based flame retardants, inorganic flame retardants, organic metallic salt compounds, silicone resin-based flame retardants, fluorine resin-based flame retardants, terpene resin-based flame retardants, and amorphous thermoplastic resins having flame retardancy. In the present invention, these flame retardants may be used solely or two or more kinds may be used in combination.

Examples of a flame retardant of a bromine-based compound include a brominated bisphenol A type epoxy polymer, pentabromobenzyl acrylate, a brominated polycarbonate oligomer, a triazine-based flame retardant, tetrabromobisphenol A, bis(tribromophenoxy)ethane, tetrabromobisphenol A-bis (2-hydroxyethylether), tetrabromobisphenol A-bis(2,3-dibromopropylether), tetrabromobisphenol A-bis(allylether), hexabromocyclododecane, polydibromophenylene oxide, a decabromodiphenyl ether, and a brominated phthalic acid ester, but are not limited thereto. Among them, a decabromodiphenyl ether is preferable.

When a bromine-based compound is used as a flame retardant, the content of the flame retardant is 0.1 to 20 part(s) by mass, preferably 0.5 to 15 part(s) by mass, and more preferably 1 to 10 part(s) by mass, with respect to 100 parts by mass of the amorphous thermoplastic resin. When this amount is too small, desired flame retardancy cannot be maintained, and when this amount is too large, an adverse effect is given to mechanical characteristics.

For a flame retardant of a phosphorus-based compound, a phosphoric acid ester compound is preferable. Examples of the phosphoric acid ester compound in the present invention include trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl)phosphate, diisopropylphenyl phosphate, trixylenyl phosphate, tris(isopropylphenyl)phosphate, trinaphthyl phosphate, bisphenol A bisphosphate, hydroquinone bisphosphate, resorcin bisphosphate, resorcinol-diphenyl phosphate, trioxybenzene triphosphate, cresyl diphenyl phosphate, and ammonium polyphosphate, but are not limited thereto. Furthermore, examples include compounds introduced with various substituents, oligomers and polymers thereof. Among them, ammonium polyphosphate is preferable.

When a phosphorus-based compound is used as a flame retardant, the content of the flame retardant is 1 to 30 parts by mass, preferably 3 to 25 parts by mass, and more preferably 5 to 15 parts by mass, with respect to 100 parts by mass of the amorphous thermoplastic resin. When this amount is too small, desired flame retardancy cannot be maintained, and when this amount is too large, an adverse effect is given to mechanical characteristics.

Examples of a nitrogen-based flame retardant include triazine compounds such as melamine, cyanuric acid, melamine cyanurate and melaminephosphate, polyphosphoric acid melamine, sulfuric acid melamine, urea, and isocyanurate, but are not limited thereto. Among them, polyphosphoric acid melamine is preferable.

When a nitrogen-based compound is used as a flame retardant, the content of the flame retardant is 1 to 100 part(s) by mass, preferably 5 to 75 parts by mass, and more preferably 10 to 50 parts by mass, with respect to 100 parts by mass of the amorphous thermoplastic resin. When this amount is too small, desired flame retardancy cannot be maintained, and when this amount is too large, an adverse effect is given to mechanical characteristics.

Examples of an inorganic flame retardant include aluminum hydroxide, calcium hydroxide, magnesium hydroxide, magnesium carbonate, antimony trioxide, antimony tetroxide, antimony pentoxide, sodium antimonate, guanidine salts such as guanidine sulfamate, guanidine phosphate, guanylurea phosphate and melamine phosphate, zinc borate, ammonium borate, boric acid, ammonium aluminum hydroxycarbonate, ammonium molybdate, molybdenum oxide, molybdenum oxide, benzoylferrocene, ferrocene, tin compounds such as tin oxide, a hydrated tin compound and zinc stannate, inorganic complexes such as metallic salts of aromatic sulfenacide, acetyl acetone, salicylaldehyde, 8-hydroxycinnoline and dimethylglyoxime, and alkali and alkali earth metallic salts of a phosphorus-nitrogen compound, calcium aluminate hydrate, calcium-aluminum-silicate, a zirconium compound, dawsonite, aliphatic sulfonate, aromatic sulfonate, aromatic sulfonamide salts, sulfimide salts, imidediphosphate tetraester salts, and fluorinated aliphatic sulfonates, but are not limited thereto. Among them, magnesium hydroxide is preferable.

When an inorganic compound is used as a flame retardant, the content of the flame retardant is 10 to 200 parts by mass, preferably 30 to 150 parts by mass, and more preferably 50 to 100 parts by mass, with respect to 100 parts by mass of the amorphous thermoplastic resin. When this amount is too small, desired flame retardancy cannot be maintained, and when this amount is too large, an adverse effect is given to mechanical characteristics.

Examples of an organic metallic salt compound include metallic salts of aromatic sulfonic acids and metallic salts of perfluoroalkane sulfonic acids. Examples of metal kinds of the metallic salts include alkali metals and alkali earth metals. Examples of organic metallic salt compounds in the present invention include a potassium salt of 4-methyl-N-(4-methylphenyl)sulfonyl-benzenesulfonamide, potassium diphenylsulfone-3-sulfonate, potassium diphenyl sulfone-3-3-disulfonate, sodium paratoluenesulfonate, and a perfluorobutane sulfonic acid potassium salt, but are not limited thereto. Among them, perfluorobutane sulfonic acid potassium salt is preferable.

When an organic metallic salt compound is used as a flame retardant, the content of the flame retardant is 0.1 to 10 part(s) by mass, preferably 0.1 to 5 part(s) by mass, and more preferably 0.1 to 2 part(s) by mass, with respect to 100 parts by mass of the amorphous thermoplastic resin. When this amount is too small, desired flame retardancy cannot be maintained, and when this amount is too large, an adverse effect is given to mechanical characteristics.

Examples of a silicone resin-based flame retardant include polyorganosiloxane such as poly(dimethylsiloxane), poly (diphenylsiloxane) and poly(methylphenylsiloxane), silicon oils such as epoxy-modified polyorganosiloxane, methacryl group-modified polyorganosiloxane, and amino group-modified polyorganosiloxane, silicon resins, silicon rubbers, and silicon powder, but are not limited thereto. Among them, poly(dimethylsiloxane) is preferable.

When a silicone resin-based flame retardant is used as a flame retardant, the content of the flame retardant is 0.05 to 8 part(s) by mass, preferably 0.1 to 5 parts by mass, and more preferably 0.1 to 2 part(s) by mass, with respect to 100 part(s) by mass of the amorphous thermoplastic resin. When this amount is too small, desired flame retardancy cannot be maintained, and when this amount is too large, an adverse effect is given to mechanical characteristics.

Examples of a fluorine resin-based flame retardant include fluorine-based metallic salts, polytetrafluoroethylene, a copolymer of tetrafluoroethylene and hexafluoropropylene, and fluorine phthalimide, but are not limited thereto. Among them, polytetrafluoroethylene is preferable.

When a fluorine resin-based flame retardant is used as a flame retardant, the content of the flame retardant is 0.05 to 8 part(s) by mass, preferably 0.1 to 5 part(s) by mass, and more preferably 0.1 to 2 part(s) by mass, with respect to 100 parts by mass of the amorphous thermoplastic resin. When this amount is too small, desired flame retardancy cannot be maintained, and when this amount is too large, an adverse effect is given to mechanical characteristics.

Examples of a terpene resin-based flame retardant include an α-pinene resin, β-pinene resin, limonene resin, dipentene resin, β-pinene/limonene resin, hydrogenated limonene resin, aromatic-modified terpene resin, and phenol-modified terpene resin, but are not limited thereto. Among them, an α-pinene resin is preferable. When a terpene resin-based flame retardant is used as a flame retardant, the content of the flame retardant is 1 to 30 part(s) by mass, preferably 2 to 20 parts by mass, and more preferably 5 to 15 parts by mass, with respect to 100 parts by mass of the amorphous thermoplastic resin. When this amount is too small, desired flame retardancy cannot be maintained, and when this amount is too large, an adverse effect is given to mechanical characteristics.

Examples of an amorphous thermoplastic resin having flame retardancy include a poly(vinyl chloride), a poly(ether imide), a poly(ether sulfone), a polysulfone, and a polyamideimide, but are not limited thereto. Among them, a polyvinyl chloride is preferable.

Ammonium borate or zinc borate may also be used as the other flame retardant agent. The above described flame retardant agent may be used singly or two or more kinds thereof may be used in combination in the present invention.

In the present invention, various additives such as a crystallization nucleating agent, a crystallization accelerating agent, a foam nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a plasticizer, a thickening agent, and a thinning agent can be suitably blended to a thermoplastic resin before foaming within the range not damaging the object of the present invention, in addition to a melt-type crystallization nucleating agent. Further, a resin layer containing the above described additives may be laminated to a reflecting material composed of the obtained amorphous thermoplastic resin foam sheet, or a coating material containing the above described additives may be applied thereto. Among them, it is preferred that a layer containing an anti-ultraviolet agent and the like is provided to at least one surface of the reflecting material composed of the amorphous thermoplastic resin foam sheet, from the viewpoint of prevention of deterioration of the amorphous thermoplastic resin due to ultraviolet rays.

A method of producing the amorphous thermoplastic resin foam sheet of the present invention will be described below.

A mixture obtained by adding a melt-type crystallization nucleating agent (B) and, according to the necessity, other resins or additives to an amorphous thermoplastic resin (A) are melt-kneaded using, for example, a kneader or an extruder, thereby preparing a resin composition. Kneading conditions such as a kneading temperature and a kneading time can be suitably set to a temperature at which the amorphous thermoplastic resin (A) and the melt-type crystallization nucleating agent (B) are molten. For example, in the case of polycarbonate, 270° C. or more is preferable. A pressure can also be suitably set. The resin composition is formed into a sheet using an extruder or the like, and the resin sheet and a separator are overlapped and rolled to be formed into a roll. The roll is maintained in a pressurized inert gas atmosphere, thus letting the resin sheet contain the inert gas. Further, the resin sheet containing the inert gas is heated at the glass transition temperature (Tg) of the amorphous thermoplastic resin (A) or more under normal pressure thereby to be foamed. Heating at Tg or more suppresses generation of nonuniform bubbles. A thermoplastic resin foam sheet is thus obtained. A mass fraction of a crosslinked portion in the thermoplastic resin foam sheet is less than 10%. A crosslinking degree can be found by immersing the foam sheet into a solvent that can solve a non-crosslinked portion and calculating a weight fraction of undissolved portion to the whole weight of the original foam. For example, in the case of a polycarbonate foam, a soluble portion can be removed by immersing the foam into a methylene chloride solution with stirring for approximately 12 hours.

In the present invention, examples of the above described inert gas include helium, nitrogen, carbon dioxide, and argon. Among them, carbon dioxide is preferable from the viewpoint of permeability of a gas into a resin (speed, solubility).

A permeation time of an inert gas and an impregnation amount of an inert gas until a resin sheet attains a saturated state are different depending on a kind of a resin to be foamed, a kind of an inert gas, a permeation pressure and a sheet thickness.

In addition, an organic solvent may be contained in the resin sheet before containing an inert gas in a roll composed of the resin sheet and a separator in a pressurized inert gas atmosphere in this method.

Examples of the organic solvent include benzene, toluene, methyl ethyl ketone, ethyl formate, acetone, acetic acid, dioxane, m-cresol, aniline, acrylonitrile, dimethyl phthalate, nitroethane, nitromethane, and benzyl alcohol. Among them, acetone is preferable from the viewpoints of handling property and economical efficiency.

A mean diameter of a bubble present in the thermoplastic resin foam according to the present invention is 10 µm or less in the present invention. In particular, the mean diameter is preferably 5 µm or less, and particularly preferably 2 µm or less. When the mean bubble diameter is too large, a desired high reflectivity cannot be obtained.

The expansion ratio of the foam of the present invention is preferably 1.1 to 10, and more preferably 2 to 5.

The total reflectivity of the thermoplastic resin foam is preferably 97% or more in the present invention. In particular, the total reflectivity is preferably 98.5% or more, and particularly preferably 99% or more. The term "total reflectivity" mentioned herein is a relative value shown with a reflectivity of an aluminum oxide white plate (210-0740: manufactured by Hitachi High-Tech Fielding Corporation) at 100% at a wavelength of 550 nm, using a spectrophotometer (U-4100: manufactured by Hitachi High-Technologies Corporation).

Then, the light reflecting material of the present invention will be described.

Fine bubbles with a uniform bubble diameter are formed in the thermoplastic resin foam of the present invention. Due to these fine and uniform bubbles, the thermoplastic resin foam of the present invention has a high reflectivity. The thermoplastic resin foam of the present invention can be used in, for example, a reflection plate for light, a reflection plate for electrical spectacular signs, a reflection plate for back light of a liquid crystal display TV and a mobile-phone, and the like, utilizing such a high reflectivity and excellent moldability.

EXAMPLES

The present invention will be described in more detail based on examples given below, but the invention is not meant to be limited by these.

Examples 1 to 9 and Comparative Examples 1 to 7

Contents of respective components of the resin compositions of examples 1 to 9 and comparative examples 1 to 7

(numbers in the table are based on part by mass as otherwise particularly notified) are shown in Table 1. A sheet before foaming was obtained by melt-kneading each component shown in the table using a co-rotation twin screw extruder. A temperature at the time of extrusion was indicated as an extrusion temperature shown in the table of examples and comparative examples.

Each component material shown in the table is as follows.

Amorphous Thermoplastic Resin (A)
- A1: "SI8000L" (trade name, manufactured by Sumitomo Dow Limited), flame retardant polycarbonate, amorphous
- A2: "NOVAREX S2000" (trade name, manufactured by Mitsubishi Engineering-Plastics Corporation), polycarbonate, amorphous
- A3: FS1300 (trade name, manufactured by Sumitomo Bakelite Co., Ltd.), polyethersulfone, amorphous
- A4: SA1206 (trade name, manufactured by UNITIKA LTD.), polyethylene terephthalate, amorphous Melt-Type Crystallization Nucleating Agent (B)
- B1: "NJSTAR TF1" (trade name, manufactured by New Japan Chemical Co., Ltd.), trimesic acid tricyclohexylamide
- B2: "NJSTAR NU100" (trade name, manufactured by New Japan Chemical Co., Ltd.), N,N-dicyclohexyl-2,6-naphthalene dicarboxylic acid dicyclohexylamide Flame Retardant
- C1: "X-40-9805" (trade name, manufactured by Shin-Etsu Chemical Co., Ltd.), silicone compound
- C2: "Hostaflon TF1620" (trade name, manufactured by Sumitomo 3M Limited), polytetrafluoroethylene Next, a sheet before foaming was contained in a pressure vessel and permeated and impregnated with a carbon dioxide gas with a pressure of 6 MPa at 17° C. The permeation time was set to 48 hours or longer.

The sheet permeated with a carbon dioxide gas was taken out from the pressure vessel and immediately contained in a thermostatic chamber set at a predetermined temperature thereby to be foamed. The foaming time was set within 60 seconds. The temperature at the time of foaming was indicated as the foaming temperature in Table 1.

The following evaluations were preformed on a sheet after foaming. The obtained evaluation results of the examples 1 to 9 and the comparative examples 1 to 7 are shown in Table 1.

(1) Melt-Dispersibility

The surfaces of sheets before foaming obtained by extrusion were visually observed. A sheet in which a melt-type crystallization nucleating agent was melt-dispersed in kneading and a coagulated substance of the nucleating agent cannot be visually observed was determined to have favorable melt-dispersibility, and a sheet in which a coagulated substance was visually observed was determined to have defective melt-dispersibility. The melt-dispersibility was not evaluated in examples in which the melt-type crystallization nucleating agent was not used.

(2) Presence or Absence of Coarse Bubble

The surfaces of sheets before foaming obtained by extrusion were visually observed and when a bubble having a diameter of more than 1 mm was present, it was determined to be presence of coarse bubbles, and when such a bubble did not exist, it was determined to be no coarse bubble.

(3) Expansion Ratio

An expansion ratio was calculated as a ratio $\rho s/\rho f$ of the specific gravity ($\rho f$) of the foam sheet measured by an underwater replacement method and a specific gravity of the resin before foaming ($\rho s$).

(4) Bubble Diameter

A bubble diameter was determined in accordance with ASTM D3576-77. In other words, a scanning electron microscopy (SEM) photograph was taken of a cross-section of the sheet. Straight lines were drawn on the SEM photograph in a horizontal direction and a vertical direction. A length t of a chord of a bubble through which the straight lines pass was averaged. A magnification of the photograph, M, was assigned to an expression below and a mean bubble diameter d was determined.

$$d=t/(0.616\times M)$$

However, since a bubble diameter of a coarse bubble part significantly differs from a fine bubble part, and therefore, the measurement was carried out after removing the coarse bubble.

(5) Reflectivity

The total reflectivity was measured at a wavelength of 550 nm in the condition of a spectral slit of 4 nm using a spectrophotometer (U-4100: manufactured by Hitachi High-Technologies Corporation). In Table 1, relative values of total reflectivity of each foam sheet are shown, with a total reflectivity of a white board that was solidified finely-powdered aluminum oxide (210-0740: manufactured by Hitachi High-Technologies Corporation) at 100%.

(6) Moldability

Mold reproducibility (such as sharpness of an edge and dent on the bottom surface) of a foam sheet after molding was visually determined. The case of having high mold reproducibility was determined to be preferable, and the case of having poor mold reproducibility was determined to be defective.

(7) Flame Retardancy

The sheet before molding was cut out into a predetermined size after foaming, and evaluated in accordance with the 50 W (20 mm) vertical burning test of UNDERWRITERS LABORATORIES UL-94, edition 5 (1996).

(8) Crosslinking Degree

The foam sheet was immersed into a methylene chloride solution and stirred for 12 hours. Weights of the foam sheet before and after immersion were measured, and the weight after immersion was divided with the weight before immersion to thus obtain a crosslinking degree.

From the result in Table 1, generation of coarse bubbles was reduced due to adding a melt-type crystallization nucleating agent to an amorphous thermoplastic resin. At the same time, it was found that this foam obtained a high reflectivity.

TABLE 1

| | Material | | | | | | Process condition | | |
| --- | --- | --- | --- | --- | --- | --- | --- | --- | --- |
| | Amorphous thermoplastic resin (A) | | Melt-type crystallization nucleating agent (B) | | Flame retardant (C) | | Extruding temperature | Foaming temperature | Molding temperature |
| | Kind | Mass parts | Kind | Mass parts | Kind | Mass parts | ° C. | ° C. | ° C. |
| Example 1 | A1 | 100 | B1 | 2 | | | 280 | 150 | 150 |
| Example 2 | A1 | 100 | B1 | 0.25 | | | 280 | 150 | 150 |

TABLE 1-continued

| | | | | | | | | | |
|---|---|---|---|---|---|---|---|---|---|
| Example 3 | A1 | 100 | B1 | 2.5 | | | 280 | 150 | 150 |
| Example 4 | A1 | 100 | B2 | 2 | | | 290 | 150 | 150 |
| Example 5 | A1 | 100 | B2 | 2.5 | | | 290 | 150 | 150 |
| Example 6 | A1 | 100 | B1 | 1 | C2 | 0.3 | 280 | 145 | 150 |
| Example 7 | A2 | 100 | B1 | 1 | C1, C2 | 5, 0.3 | 280 | 145 | 150 |
| Example 8 | A3 | 100 | B1 | 1 | | | 300 | 300 | 150 |
| Example 9 | A3 | 100 | B1 | 1 | C1 | 5 | 300 | 300 | 150 |
| Comparative example 1 | A1 | 100 | | | | | 280 | 150 | 150 |
| Comparative example 2 | A2 | 100 | | | | | 280 | 150 | 150 |
| Comparative example 3 | A3 | 100 | | | | | — | — | 150 |
| Comparative example 4 | A1 | 100 | B1 | 0.1 | | | 290 | 150 | 150 |
| Comparative example 5 | A1 | 100 | B2 | 3 | | | 280 | 145 | 150 |
| Comparative example 6 | A2 | 100 | B2 | 3 | | | 280 | 145 | 150 |
| Comparative example 7 | A4 | 100 | | | | | 280 | 230 | 150 |

| | Results of evaluation | | | | | | | |
|---|---|---|---|---|---|---|---|---|
| | Crosslinking degree | Melt-dispersibility Visual observation | Absence or presence of coarse bubble | Expansion ratio — | Bubble diameter μm | Reflectivity % | Moldability Visual observation | Flame retardancy level UL94 |
| Example 1 | 0 | Good | None | 3 | 1.5 | 99.5 | Good | V-2 |
| Example 2 | 0 | Good | None | 3.5 | 2 | 98.5 | Good | — |
| Example 3 | 0 | Good | None | 2.7 | 1.3 | 99.2 | Good | V-2 |
| Example 4 | 0 | Good | None | 3 | 1.5 | 99.4 | Good | V-2 |
| Example 5 | 0 | Good | None | 3.5 | 2.1 | 98.3 | Good | — |
| Example 6 | 0 | Good | None | 2.6 | 1.8 | 99.2 | Good | V-0 |
| Example 7 | 0 | Good | None | 2.8 | 1.9 | 99.1 | Good | V-0 |
| Example 8 | — | Good | None | 2.8 | 2.2 | — | Good | V-2 |
| Example 9 | — | Good | None | 2.6 | 2.1 | — | Good | V-0 |
| Comparative example 1 | 0 | — | Presence | 4.5 | 8 | 97.5 | Good | — |
| Comparative example 2 | 0 | — | Presence | 4.6 | 4 | 97.4 | Good | — |
| Comparative example 3 | — | — | — | 3.4 | 3 | — | Good | V-2 |
| Comparative example 4 | 0 | Good | Presence | 4.3 | 4 | 98.1 | Good | V-2 |
| Comparative example 5 | 0 | Not good | — | — | — | — | — | — |
| Comparative example 6 | 0 | Not good | — | — | — | — | — | — |
| Comparative example 7 | 0 | — | None | 3.6 | 3 | 99 | Not good | HF-1 |

*In each of the comparative examples 5 and 6, since the melt-dispersibility was not good, the measurements of the expansion ratio and the like were not conducted.

INDUSTRIAL APPLICABILITY

The present invention can provide a thermoplastic resin foam having a fine and uniform bubble diameter and excellent in moldability and a light reflecting material with a high reflectivity, which uses the thermoplastic resin foam.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A thermoplastic resin foam, comprising a bubbles with an average bubble diameter of 10 μm or less in the inside thereof,
wherein the thermoplastic resin foam is prepared by using and foaming a thermoplastic resin composition containing 0.25 to 2.5 part(s) by mass of a melt-type crystallization nucleating agent (B), with respect to 100 parts by mass of an amorphous thermoplastic resin (A),
wherein the amorphous thermoplastic resin (A) is polycarbonate, and
wherein the melt-type crystallization nucleating agent (B) is a compound represented by the following formula (1):

$$R^1\text{—}(CONHR^2)_a \quad \text{Formula (1)}$$

wherein $R^1$ represents a saturated or unsaturated aliphatic polycarboxylic acid residue having 2 to 30 carbon atoms, a saturated or unsaturated alicyclic polycarboxylic acid residue having 4 to 28 carbon atoms, or an aromatic polycarboxylic acid residue having 6 to 28 carbon atoms; $R^2$ represents an alkyl group having 1 to 18 carbon atom(s), an alkenyl group having 2 to 18 carbon atoms, a cycloalkyl group or a cycloalkenyl group having 3 to 12 carbon atoms, a phenyl group, a naphthyl group, or an anthryl group; and a represents an integer from 2 to 6.

2. The thermoplastic resin foam according to claim 1, wherein the melt-type crystallization nucleating agent (B) is at least one selected from the group consisting of trimesic acid tris(t-butylamide), trimesic acid tricyclohexylamide, trimesic acid tri(2-methylcyclohexylamide), trimesic acid tri(4-methylcyclohexylamide), 1,4-cyclohexane dicarboxylic acid dianilide, 1,4-cyclohexanoic acid dicarboxylic acid dicyclohexylamide, 1,4-cyclohexanoic acid dicarboxylic acid dibenzylamide, 2,6-naphthalene dicarboxylic acid dicyclohexylamide, 1,2,3,4-butane tetracarboxylic acid tetracyclohexylamide and 1,2,3,4-butane tetracarboxylic acid tetraanilide.

3. The thermoplastic resin foam according to claim 1, wherein the thermoplastic resin foam satisfies V-0, V-1 or V-2 in the UL-94 vertical burning test.

4. A light reflecting material according to claim 1, being molded by using the amorphous thermoplastic resin foam.

5. A method of producing a thermoplastic resin foam, comprising bubbles with an average bubble diameter of 10 μm or less in the inside thereof, comprising the steps of:
preparing a thermoplastic resin composition by melt-dispersing 0.25 to 2.5 part(s) by mass of a melt-type crystallization nucleating agent (B), with respect to 100 parts by mass of an amorphous thermoplastic resin (A), wherein the amorphous thermoplastic resin (A) is polycarbonate; and wherein the melt-type crystallization nucleating agent (B) is a compound represented by the following formula (1):

$$R^1\text{---}(CONHR^2)_a \qquad \text{Formula (1)}$$

wherein $R^1$ represents a saturated or unsaturated aliphatic polycarboxylic acid residue having 2 to 30 carbon atoms, a saturated or unsaturated alicyclic polycarboxylic acid residue having 4 to 28 carbon atoms, or an aromatic polycarboxylic acid residue having 6 to 28 carbon atoms; $R^2$ represents an alkyl group having 1 to 18 carbon atom(s), an alkenyl group having 2 to 18 carbon atoms, a cycloalkyl group or a cycloalkenyl group having 3 to 12 carbon atoms, a phenyl group, a naphthyl group, or an anthryl group; and a represents an integer from 2 to 6;

depositing the melt-type crystallization nucleating agent by solidifying the composition followed by impregnating an inert gas to the composition under pressure; and foaming the composition impregnated with the inert gas by heating at a temperature of a glass transition temperature of the amorphous thermoplastic resin or more under a released pressure.

* * * * *